United States Patent [19]

Adell

[11] 4,379,377
[45] Apr. 12, 1983

[54] EDGE GUARD

[75] Inventor: Robert Adell, Sunnyvale, Tex.

[73] Assignee: U.S. Product Development Company, Novi, Mich.

[21] Appl. No.: 323,513

[22] Filed: Nov. 23, 1981

[51] Int. Cl.³ .............................................. B60J 5/00
[52] U.S. Cl. ........................................ 49/462; 52/716
[58] Field of Search ................................ 49/462, 460; 52/716–718; 428/126, 192

[56] References Cited

U.S. PATENT DOCUMENTS

| 4,259,812 | 4/1981 | Adell | 52/716 X |
| 4,291,076 | 9/1981 | Katoh | 52/716 X |
| 4,338,148 | 7/1982 | Adell | 49/462 X |

Primary Examiner—Philip C. Kannan
Attorney, Agent, or Firm—Stephenson and Boller

[57] ABSTRACT

An edge guard formed from a metallic strip to a generally U-shaped cross section wherein the base of the U has a generally semi-circular shape and beads at the distal ends of the legs are inwardly offset. An insulating liner may also be laminated to the metal strip before roll forming to the U-shape.

12 Claims, 4 Drawing Figures

EDGE GUARD

BACKGROUND AND SUMMARY OF THE INVENTION

This invention relates to ornamental and protective edge guards such as applied to the edges of sheet metal members of automotive vehicles, for example swinging closures such as doors, trunk lids, hoods, gasoline fill doors, and other members such as drip rails, bumper edges, etc.

In the case of the vehicle's doors door edge guards are applied to the trailing edges to protect them from damage which might be caused by striking an object which may be present in a door's path when the door is opened. It is also desirable for such door edge guards to be made of bright metal such as stainless steel, aluminum, or a bimetal due to the excellent protective and ornamental character of such materials. Furthermore the inherent strength and resiliency of metallic edge guards enable them to be self-retaining on the doors. Correspondingly it is generally undesirable to use separate fasteners or adhesives in securing door edge guards to doors since they involve extra cost in labor and materials. It is also generally undesirable to use strictly non-metallic edge guards such as plastic edge guards since they do not possess the excellent protective ornamental and self-retention characteristics of bright metallic edge guards. In connection with the usage of self-retaining edge guards, it has heretofore been recognized that the potential for paint scratching and marring exists when the metal edge guards are applied to the vehicle door edges. Such paint scratching can lead to premature corrosion of the door edge metal. Some of applicant's own inventions have addressed this matter of possible paint scratching and corrosion and have provided solutions. Some of applicant's prior inventions are represented by issued U.S. Pat. Nos. 2,704,687 and 4,259,812 as well as pending patent applications Ser. Nos. 118,475; 132,525; 194,747; 194,748; 194,749; 216,483; and 216,860. Certain of these disclose the use of plastic liners to insulate the metal edge guard from the vehicle door. The liners may be extruded plastic, plastic encapsulation, foam plastic or plastic film by way of example.

In particular, reference is made to pending application Ser. No. 216,860 which contains an example of an edge guard having a laminated plastic lining with the legs of the edge guard having insulated metal beads running along the free ends of the legs and by which the retention force is applied to the door. Metal beads are particularly useful for they can provide a stiffening of the legs at the point of force application to the door while also providing a decorative feature in the case of the insulated metal construction wherein the beads are formed by outwardly reversing the ends of the legs so as to yield a band or narrow strip of the insulating liner exposed to view. The linear can be a dark plastic so that the narrow strip appears as a colored band which contrasts with the bright metal of the remaining exposed portion of the edge guard so that the overall appearance of the edge guard is particularly pleasing and/or decorative. The present invention however may be practiced with or without such liners although usage of liners is definitely preferred.

One of the important advantages of metal door edge guards of the type which applicant has invented and successfully developed is that the metal edge guards are self-retaining. This means that no separate fasteners, adhesives or extra procedures are required in order to install the edge guards on the doors. Thus further means that there is less possibility for corrosive action to be initiated and it means that the installation procedure is less complicated. In many instances the edge to which the edge guard is applied will have a particular contour conforming to the desired styling of the vehicle. In most instances this is other than a straight shape and the contour will have peaks and recesses at selected locations. Applicant has also heretofore invented constructions and procedures for applying self-retaining edge guards to contoured door edges which have other than a straight shape. For example notches and overbends are procedures which have been applied in order to conform the edge guard to the contour of the door edge and enhance the effectiveness of the legs of the edge guard in retaining the edge guard on the door.

The present invention is directed to a new and improved door edge guard having a new and unique cross sectional shape which provides advantages which have heretofore not been obtained with prior edge guards. Never before in applicant's thirty years of edge guard manufacture has there been an edge guard of such retention quality which can self-retain on edges of far greater irregularity. In particular the invention has resulted in improved tolerance control of the door edge guard cross section and this in turn can minimize the amount of additional procedures such as notching and overbending which otherwise might have to be applied to a door edge guard. The invention provides a stronger edge guard cross section with improved retention capability, yet there are no extra complications of the manufacturing procedure or of the installation procedure. While the invention is preferably utilized with insulated metal edge guards, it is possible for the invention to be practiced without the use of insulation if that is what is desired. The edge guard of the present invention has what may be considered as basically a U-shaped cross section but there are particular details of the cross section which constitute new and unique features providing heretofore unobtained advantages.

In accordance with the principles of the invention the edge guard is provided with beads at the distal ends of the legs which are formed by outwardly reversing the metal strip of the edge guard back onto itself. The legs further include an offset whereby the point at which the beads bear against the door edge is inwardly offset. The beads themselves may be either open or closed and they may be either inwardly or outwardly reversed. In the preferred embodiment disclosed in the drawing the edge guard has an insulating liner through which the force is applied to the door edge and the beads are turned outwardly. The base of the U-shaped cross section is basically of a semi-circular shape which merges into the offsets on opposite sides of the cross section. The invention yields the advantage that the dimension across the throat of the edge guard (i.e. the opening between the beads) can be much better controlled dimensionally from the manufacturing standpoint and yet a very strong but resiliently expansible edge guard results. By the two sides of the edge guard being symmetrical and by the bearing portions of the beads facing each other and being generally flat, but with the leading edge of each bead being rounded, installation of the edge guard on a door edge is particularly convenient, yet when installed the edge guard is very securely self-retained. A further advantage, particularly in the case of an insulated metal edge guard where the installation is applied to the full width of the metal strip from which the edge guard is formed, is that a thin band of insulation material is exposed to view where the distal end of each leg has the bead formed by turning the end of the leg outwardly. This, coupled with the offset, renders the exposed decorative band generally flush with a tangent to the region where the offset merges with the generally semicylindrical base of the edge guard. In this way the invention possesses various functional and decorative aspects. While the disclosed usage is as a door edge guard, other usages are contemplated.

The foreoing features, advantages, and benefits of the invention, along with additional ones, will be seen in the ensuing description and claims which should be considered in conjunction with the accompanying drawings. The drawings disclose preferred embodiments of the invention according to the best mode contemplated at the present time for carrying out the invention.

DESCRIPTION OF THE PREFERRED EMBODIMENT

Figure 1:
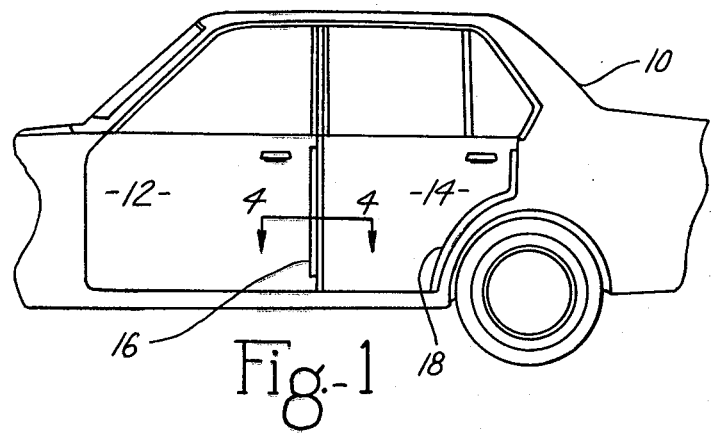
FIG. 1 is a fragmentary side elevational view of a vehicle containing door edge guards embodying principles of the present invention.

FIG. 1 shows a portion of an automobile 10 comprising front and rear doors 12 and 14 on the trailing edges of which are door edge guards 16 and 18 respectively embodying principles of the present invention. The edge guards are generally elongate and essentially coextensive in length with the trailing edges of the doors, each guard conforming to the contour of the trailing edge of its door. It will be appreciated that the actual length of an edge guard may be somewhat less than the length of the trailing edge and therefore that the drawing is merely exemplary.

Figure 2:
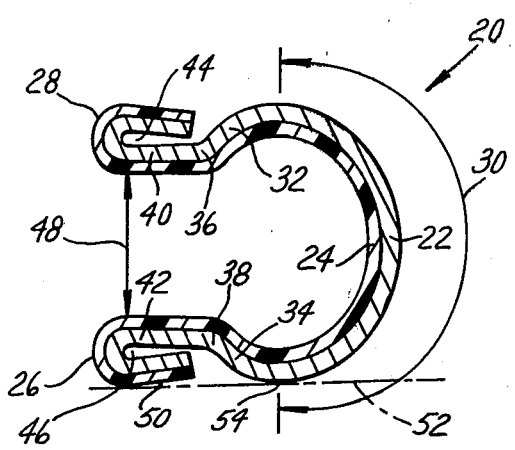
FIG. 2 is a transverse cross section view through a door edge guard embodying principles of the invention and shown by itself.

FIG. 2 illustrates a first embodiment of cross section, referred to by the reference numeral 20, for a door edge guard embodying principles of the invention. While the cross section represents the engineering design shape, it will be appreciated that in actual specimens the cross section of the end of the specimen may depart from the formed shape. This is because the metal distorts and deforms when cut. It will also be appreciated that some distortion of the cross section may occur due to manufacturing procedures. For example, where the beads are squeezed and deformed, they may in actual practice be slightly distorted; also where the edge guard is swept to conform to a sweep in the edge contour, the cross section may also distort. However, the strength which is imparted through the invention means that better dimensional control of the throat of the channel results and hence the improved self-retention and installation characteristics. This embodiment is an insulated metal edge guard comprising a metal edge guard 22 and an insulating liner 24. In this embodiment the insulating liner 24 is a plastic such as vinyl which is applied in surface-to-surface contact with the full surface of one side of the metal strip from which the edge guard 22 is formed. Details of this fabrication procedure are disclosed in certain of applicant's pending applications referred to above. The resultant construction has insulated metal beads 26 and 28 respectively at the distal ends of the outer and inner legs. The door edge guard cross section may be considered basically of a U-shape; however the particular details of the edge guard provide new and unique structural features which provide heretofore unavailable benefits in a door edge guard.

The edge guard is formed into the illustrated shape through roll forming procedures and this shape may be considered as constituting a generally semi-circular segment 30 constituting the base of the U. In using this as well as the ensuing terminology, it will be appreciated that such terminology is intended to be construed by way of illustration and not by way of limitation. The cross section continues from the diametrically opposite ends of the semi-circular base section 30 as contoured inward offset segments 32 for the inner leg and 34 for the outer leg. Alternatively the segments 30, 32 and 34 potentially could be considered as a segment by itself having an extent of somewhat more than a semi-circle. While these segments 32 and 34 are of an approximately circular contour, it is not absolutely essential that they have such circular contour and hence the contour could be more straight than is shown, or sharper than is shown. Viewed another way the legs of the cross section could be considered as extending part way into opposite sides of the base 30.

The cross section continues further from the two offset segments 32 and 34 as formed segments 36 for the inner leg and 38 for the outer leg. The segments 36, 38 are also essentially curved with their centers of curvature being exterior of the cross section. These segments in turn merge into generally straight segments 40 for the inner leg and 42 for the outer leg. These segments 40 and 42 also constitute a part of the respective beads 26 and 28. In use, the self-retention force of the edge guard on the door is applied through these segments 40 and 42 via the insulating liner which overlies these segments bearing against the door edge on opposite sides.

The beads 26 and 28 are formed by outwardly reversing the extreme distal margins of the legs approximately 180 degrees. In the illustrated cross section 20 the reversals are more than 180 degrees with there being provided small openings 44 and 46 respectively in the respective beads; in other words the beads are not fully closed as in the example of FIG. 3 which will be hereinafter explained.

One of the advantages of the invention is that the cross section has a substantial strength yet it can be readily applied to the edge of the door and when applied will exert a substantial retention force. The exact reason for this unique attribute is not known; however it is believed to be developed through the inclusion of the offsets, the beaded legs and the semi-circumferential span at the base of the U. A still further attribute is that in actual manufacture the dimension across the throat or opening of the edge guard indicated by the reference numeral 48 can be more precisely controlled. Because of the strength of the cross section and its resistance to collapse the opening should remain at the desired dimension when it comes time to install the edge guard on the door even though the edge guard has been subjected to the usual handling involved in shipment from the supplier's plant to the assembly plant. The invention permits the use of lighter and cheaper metal with lighter gage increasing the yield per pound and saving the consumer money.

The resistance of the cross section to collapse is dramatically demonstrated if one were to attempt to apply a force to the beads urging the beads together. It would be found to that it is virtually impossible to manually collapse the door edge guard whereas with edge guards of other cross sections the resistance to collapse would be considerably lower. The dimension 48 is set to accommodate the minimum thickness of door edge which would be anticipated, yet in the other direction where larger door thickness are involved, the cross section can readily expand to accommodate those increased edge thicknesses. Irrespective of the thickness of the particular door edge within the specified thickness tolerance, excellent retention characteristics are obtained yet the edge guard can be easily applied to the door. Indeed the edge guard possesses surprisingly remarkable attributes.

A further attribute of the invention is that the outwardly turned beads have the exposed insulation visible to an observer as indicated by the reference numeral 50. The outside of the edge guard bead is approximately flush with a tangent line to the semi-circular segment 30, as indicated approximately by the broken line designated by the reference numeral 52. Thus the beads may be considered as being offset inwardly along the legs of the edge guard so that the exposed visible portion of the bead is generally flush with a tangent line to a more proximal portion such as at a point indicated by the reference numeral 54. Where the bead includes insulation as in this example, a particularly attractive appearance results with the insulation being substantially flush with the remainder of the leg. The insulation, by way of example, may be a vinyl plastic which has been laminated to the metal strip before roll forming and may be of a dark color such as black, brown or navy. The advantage of using a dark vinyl material is that discoloration due to aging does not pose a problem as it does with a transparent or other type of plastic which might be subject to such undesirable features as yellowing and the like due to ultra-violet light and/or ozone. Because of the unique attributes of the invention it is possible to eliminate or minimize other manufacturing procedures which are often employed in the manufacture of door edge guards such as overbending.

Figure 3:
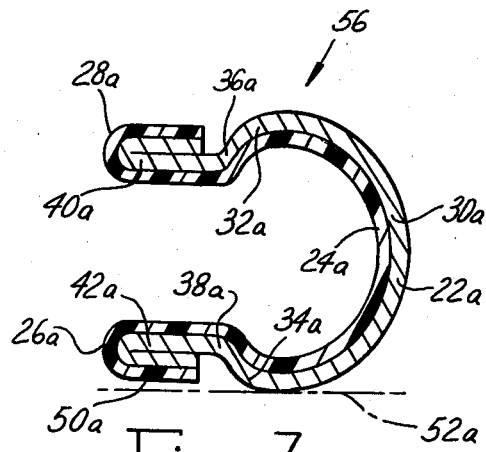
FIG. 3 is a view similar to FIG. 2 showing another embodiment by itself.

FIG. 3 illustrates a further embodiment 56 of cross section for a door edge guard embodying principles of the invention. In the embodiment of FIG. 3 those portions of the cross section which correspond to similar portions in the FIG. 2 example are identified by the same basic reference numeral but with inclusion of a small a suffix. Hence, one looking at the FIG. 3 construction will first recognize that the generally semi-circular base segment 30a is generally the same as the corresponding segment 30 in FIG. 2. The offset segments 32a and 34a are however slightly different in that they have a smaller radius of curvature than do their counterparts 32 and 34 in the FIG. 2 embodiment. Similarly the segments 36a, 38a also have different radius of curvature than their counterparts 36, 38.

Another readily noticeable difference is that the beads are fully closed in FIG. 3 so that there are no openings such as the openings 44 and 46 in the FIG. 2 example. It will also be observed that the outer edge 50a of the bead on the outer leg is not exactly tangent with the tangent line 52a corresponding to the tangent 52 in FIG. 2. The portion 50a is however parallel to the tangent line 52a and it is potentially possible to change the shape so that the portion 50a could in fact lie on the tangent line 52a. The insulating layer of the FIG. 3 example is assembled to the metal channel according to the same manufacturing procedure which is explained in connection with the FIG. 2 example. Hence the embodiment 56 is a unitary laminated structure as is the FIG. 2 embodiment.

Figure 4:
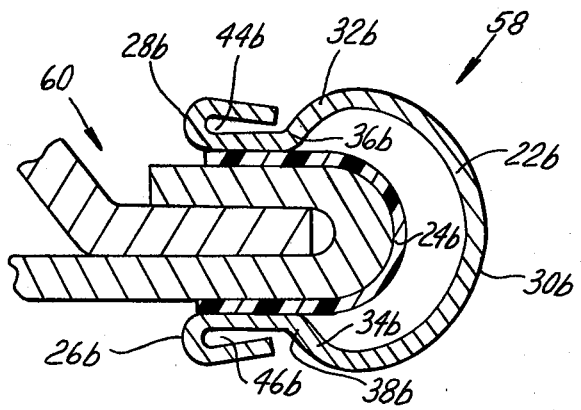
FIG. 4 is a view similar to FIGS. 2 and 3 illustrating another embodiment as applied to the edge of the door and is substantially taken in the direction of arrows 4—4 is FIG. 1 and enlarged.

FIG. 4 illustrates yet another embodiment of cross section 58 embodying principles of the invention and is substantially as taken in the direction of arrows 4—4 in FIG. 1. The reference numeral 60 designates the edge of the door which according to the prevailing manufacturing practice comprises inner and outer door panels which are secured together by the edge of outer door panel being wrapped around and secured to a flange on the inner door panel.

In the example of FIG. 4 the metal edge guard 22b and the insulating liner 24b are separate elements not bonded together as were the examples of the first two embodiments. In FIG. 4 portions of the construction corresponding to their counterparts in FIGS. 2 and 3 are identified by the same base numeral as in FIG. 2 but including the suffix small b. In the example of FIG. 4, the liner 24b is a film of vinyl insulation which has been applied over the edge of the door and of sufficient length so that when the metal edge guard 22b is installed the beads of the edge guard will bear against the opposite sides of the door edge through the two legs of the insulating liner. The liner in this way protects the entire edge of the door which is disposed within the interior of the edge guard so that the possibility of electrochemical action between the metal edge guard and the door is avoided. The plastic 24 could be vinyl, mylar, polyethylene or any similar type of material possessing insulative characteristics which prevent elctrochemical action. The liner may also provide protection against chipping or marring of the paint and could even have an impact absorbing or cushioning character to it. Hence a foam tape of similar type of material could also be used. The material could be either film or could be extruded to whatever cross sectional shape is desired. The liner could also have adhesive on one or both sides, and this could be either self-adhering, or pressure or heat activated cements.

The metal edge guard 22b is basically similar to the metal edge guard 22 of the FIG. 2 embodiment; however the semi-circular segment of the edge guard as well as the offsetting segments 32b and 34b differ slightly in dimensional characteristics from their counterparts of FIG. 2. The beaded construction is similar in that the beads are not fully closed so as to leave the openings 44b and 46b. Even through the insulating liner 24b and the metal edge guard 22b of FIG. 4 are separate elements the construction is such that assembly of the edge guard to the door edge is nonetheless readily accomplished and when installed, very substantial retention forces are the result. In all embodiments the cross section has superior resistance to collapse and dimensional stability, yet can be easily installed, and when installed possesses strong retention forces.

While preferred embodiments of the invention have been shown it will be appreciated that principles of the invention may be applied to other embodiments.

What is claimed is:

1. In an edge guard of the type comprising a metal strip formed into a generally U-shaped cross section having inner and outer legs and beads at the distal ends of the legs via which the edge guard is self-retained on the edge of an object when installed thereon, the improvement wherein the U-shaped cross section has a generally semi-circularly contoured base and includes inward offsets joining the ends of the base with each bead so that the beads are disposed in inwardly offset relation to the diametrically opposite ends of the generally semi-circularly contoured base.

2. The improvement set forth in claim 1 wherein one side of the cross section is symmetric to the other side.

3. The improvement set forth in claim 1 wherein the beads are formed by being outwardly reversed.

4. The improvement set forth in claim 3 wherein the beads are closed.

5. The improvement set forth in claim 3 in which the beads are open.

6. The improvement set forth in claim 1 wherein the edge guard includes an insulating liner lining the interior of the U-shaped cross section to insulate the metal of the edge guard from the edge of an object on which the edge guard is to be installed.

7. The improvement set forth in claim 6 wherein the insulating liner is adhered in surface-to-surface contact with the interior of the U-shaped cross section.

8. The improvement set forth in claim 6 wherein the insulating liner is a separate element.

9. The improvement set forth in claim 7 in which the insulating liner is adhered to the full width of the surface of the metal strip from which the metal edge guard is formed and the beads are formed by outwardly reversing the distal end margins of the strip so that the insulating liner covers the exterior portion of the beads to provide a band of insulation running lengthwise at the distal end of each leg on the exterior of the cross section.

10. The improvement set forth in claim 9 wherein each band of insulation is disposed generally flush with the corresponding end of the semi-circular base in the vicinity of the point at which the corresponding offset merges into the semi-circular base.

11. In an edge guard of the type comprising a metal strip formed into a generally U-shaped channel, having inner and outer legs via which the edge guard is self-retained on the edge of a door when installed thereon, the improvement wherein the distal end of the outer leg is inwardly offset relative to a proximal portion of the outer leg, the distal end being joined to the proximal portion by a curved offset.

12. The improvement set forth in claim 11 including a band of material on the exterior of the inwardly offset distal end of the outer leg.

* * * * *